United States Patent [19]
Egan et al.

[11] Patent Number: 5,671,269
[45] Date of Patent: Sep. 23, 1997

[54] TELEPHONE COMMUNICATION APPARATUS INCLUDING REPLY APPARATUS FOR RESPONDING TO AN INCOMING TELEPHONE CALL

[75] Inventors: Alistair Egan, Oxnard, Calif.; Thomas S. Tullis, Easton, Mass.

[73] Assignee: Canon Kabushiki Kaisha, Tokyo, Japan

[21] Appl. No.: 720,071

[22] Filed: Sep. 27, 1996

Related U.S. Application Data

[63] Continuation of Ser. No. 317,464, Oct. 4, 1994, abandoned.
[51] Int. Cl.⁶ .............................. H04M 1/64; H04M 1/27; H04M 1/57
[52] U.S. Cl. .................. 379/88; 379/69; 379/100; 379/127; 379/142
[58] Field of Search .................. 379/67, 69, 71, 379/82, 85, 87, 88, 89, 90, 93, 96, 97, 100, 102, 110, 127, 142, 209, 210, 214; 358/400, 402, 403

[56] References Cited

U.S. PATENT DOCUMENTS

| | | | |
|---|---|---|---|
| Re. 34,429 | 11/1993 | Baran et al. | 379/100 |
| 4,371,752 | 2/1983 | Matthews et al. | 379/89 |
| 4,581,486 | 4/1986 | Matthews et al. | 379/88 |
| 4,646,346 | 2/1987 | Emerson et al. | 379/214 |
| 4,782,521 | 11/1988 | Bartlett et al. | 379/354 |
| 4,790,003 | 12/1988 | Kepley et al. | 379/88 |
| 4,837,798 | 6/1989 | Cohen et al. | 379/88 |
| 4,896,345 | 1/1990 | Thorne | 379/67 |

(List continued on next page.)

FOREIGN PATENT DOCUMENTS

| | | | |
|---|---|---|---|
| 0462488 | 12/1991 | European Pat. Off. | 379/87 |
| 64-002454 | 1/1989 | Japan | 379/69 |
| 4-167743 | 6/1992 | Japan | 379/67 |

OTHER PUBLICATIONS

"The PhoneMail System For The ROLM CBX", ROLM Corporation 1983.
"AT&T System 85 AUDIX", AT&T Jan., 1989.
"Quick Guide to AUDIX", AT&T, Feb. 1988, Issue 2.
Product Watch: "Rolm's Phonemail—New and Improved", The Yankee Group, Mar. 10, 1987.
"General–Usage Remote–Access Storage And Forward Message Handling", W.S. Rosenbaum, IBM Technical Disclosure Bulletin, vol. 26, No. 6, Nov. 1983, p. 3071.
"While Your Were Out, PC Messages", IBM Technical Disclosure Bulletin, vol. 32, No. 9B, Feb. 1990, pp. 433–434.

(List continued on next page.)

*Primary Examiner*—Krista M. Zele
*Assistant Examiner*—Scott L. Weaver
*Attorney, Agent, or Firm*—Fitzpatrick, Cella, Harper & Scinto

[57] ABSTRACT

A telephone communication apparatus includes computing equipment programmed to send and receive telephone calls over a telephone line and a communication board connected to the computing equipment and responsive to program control therefrom. The computing equipment is responsive to detection of an incoming telephone call from a remote terminal to connect the telephone line to the computing equipment. The computing equipment also includes a data storage and a processor for receiving the incoming call and recording the telephone number of the remote terminal in the data storage without intervention by the user at the apparatus, and further includes reply apparatus for sending a reply telephone call to the remote terminal in accordance with the recorded telephone number. The processor can detect the telephone number in the incoming telephone call in a variety of ways, including detecting the telephone number as part of an incoming voice message or as part of incoming control information. The apparatus also includes structure for recording a reply message to be sent to the remote terminal.

39 Claims, 7 Drawing Sheets

U.S. PATENT DOCUMENTS

| | | | |
|---|---|---|---|
| 4,939,771 | 7/1990 | Brown et al. | 379/67 |
| 5,008,835 | 4/1991 | Jachmann et al. | 395/2.79 |
| 5,054,055 | 10/1991 | Haule et al. | 379/142 |
| 5,127,003 | 6/1992 | Doll, Jr. et al. | 370/110.1 |
| 5,155,761 | 10/1992 | Hammond | 379/67 |
| 5,181,236 | 1/1993 | LaVallee et al. | 379/67 |
| 5,260,990 | 11/1993 | MeLampy et al. | 379/67 |
| 5,282,243 | 1/1994 | Dabbaghi et al. | 379/201 |
| 5,295,181 | 3/1994 | Kuo | 379/100 |
| 5,311,574 | 5/1994 | Livanos | 379/88 |
| 5,333,266 | 7/1994 | Boaz et al. | 395/200 |
| 5,367,609 | 11/1994 | Hopper et al. | 395/2.87 |
| 5,390,236 | 2/1995 | Klausner et al. | 379/67 |
| 5,394,445 | 2/1995 | Ball et al. | 379/67 |
| 5,434,906 | 7/1995 | Robinson et al. | 379/67 |
| 5,434,910 | 7/1995 | Johnson et al. | 379/89 |
| 5,526,407 | 6/1996 | Russell et al. | 379/89 |
| 5,533,102 | 7/1996 | Robinson et al. | 379/67 |
| 5,539,808 | 7/1996 | Inniss et al. | 379/67 |

OTHER PUBLICATIONS

"PC Switchboard" DAK Winter 1991 Catalog, pp. 22–23, Advertisement.

"Dial Tone Modulation Frequency Action Mechanism", IBM Technical Disclosure Bulletin, vol. 35, No. 1A, Jun. 1992 pp. 250–251.

TELEPHONE COMMUNICATION APPARATUS INCLUDING REPLY APPARATUS FOR RESPONDING TO AN INCOMING TELEPHONE CALL

This application is a continuation of application Ser. No. 08/317,464 filed Oct. 4, 1994, now abandoned.

BACKGROUND OF THE INVENTION

1. Field of the Invention

The present invention is directed to a telephone communication apparatus, and in particular a computer terminal, for receiving and placing telephone calls. More specifically, the present invention is directed to a computer terminal that includes reply apparatus for scheduling and returning an incoming telephone call when the operator is unavailable to receive the incoming call.

2. Description of the Related Art

In recent years telephone based messaging and voice mail systems have become widely used. Many of these systems provide a wide variety of useful services to their subscribers and are valuable to those businesses that receive a high volume of incoming telephone calls. These businesses may subscribe to an external system or they may provide their own on-premises switching system, or Private Branch Exchange (PBX). Both types of systems provide businesses with advantageous features for handling their incoming calls.

One feature that is particularly advantageous is a system's ability to handle incoming calls that cannot be answered by an operator, whether because there are more incoming calls than operators on duty or because the business is closed for the day. Some mailbox systems provide a central mailbox that automatically answers calls, records messages and sends notices to the subscribers that recorded messages are available for retrieval at a convenient time. Such systems generally also allow a subscriber to reply to or forward a recorded message to another subscriber. While all these features are very useful, the user naturally must be a subscriber to the system to take advantage of them and the originator of the call may also have to be a subscriber. This may be too expensive or otherwise undesirable for some users.

SUMMARY OF THE INVENTION

In accordance with the present invention, a telephone communication apparatus that avoids the above-identified difficulties in the prior art includes computing equipment programmed to send and receive telephone calls over a telephone line. A call detector connected to the computing equipment detects, on the telephone line, an incoming telephone call from a remote terminal having a telephone number associated therewith, and a communication board connected to the computing equipment is responsive to program control therefrom. The computing equipment is then responsive to detection of an incoming telephone call by the call detector to connect the telephone line to the computing equipment. In accordance with an advantageous aspect of the present invention, the computing equipment includes a data storage, a processor for receiving the incoming calls and recording the telephone number of the remote terminal in the data storage, without intervention by a user at the apparatus, and reply apparatus for sending reply telephone call to the remote terminals in accordance with the recorded telephone number.

In accordance with a further advantageous aspect of the present invention, the apparatus can include a recording device for recording the reply message. The reply message can be automatically sent, or can be sent by the user of the apparatus either while he is operating the apparatus or at a designated reply time. Advantageously, the apparatus can interleave portions of the incoming voice message with portions of the reply message so that, for example, a series of questions in the incoming message can be responded to one by one in the reply message.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
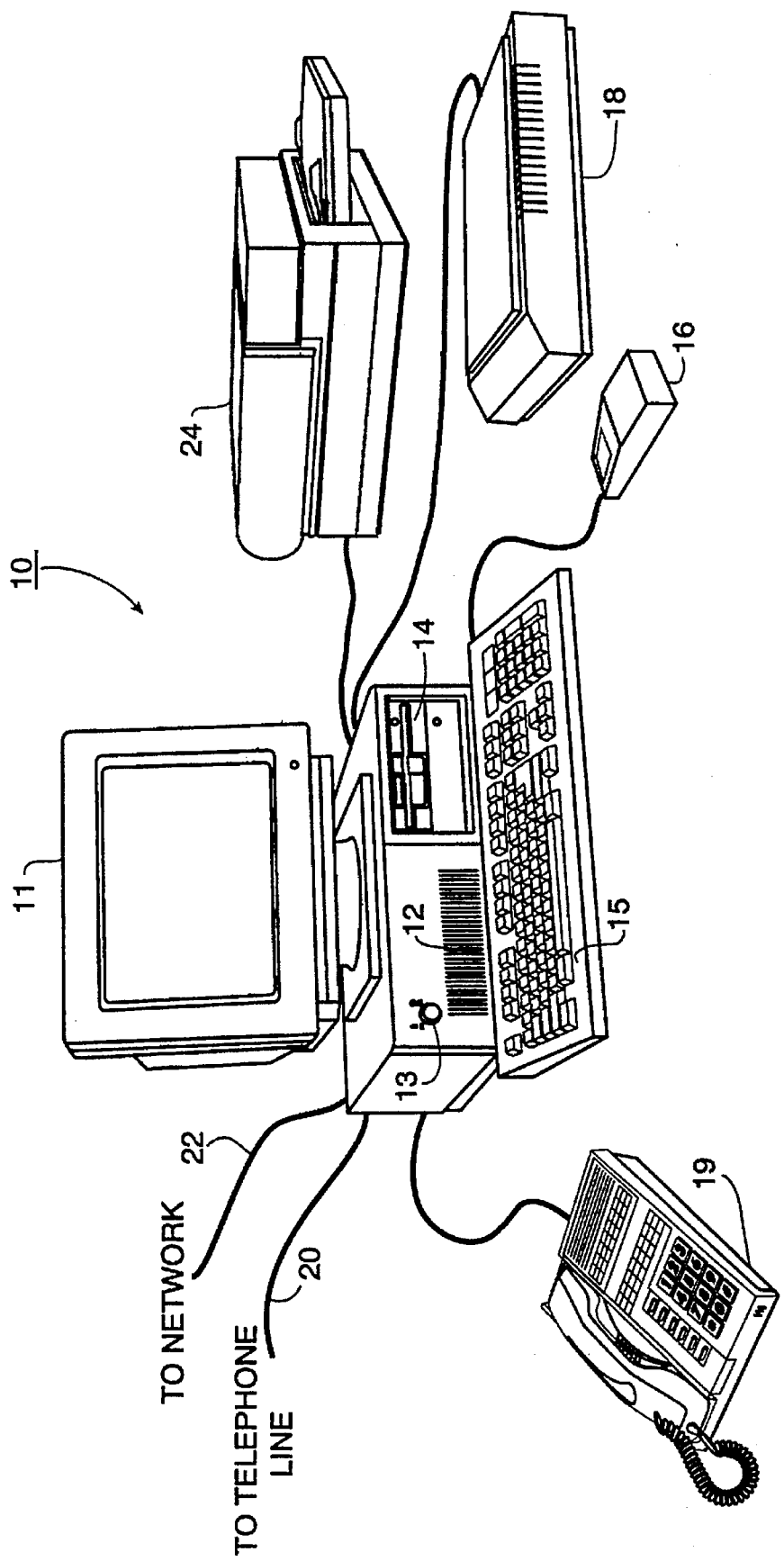
FIG. 1 is a perspective view of the outward appearance of an apparatus illustrative of a communication arrangement for personal computing equipment in which the present invention is incorporated.

FIG. 1 is a view showing the outward appearance of a representative embodiment of the invention. Shown in FIG. 1 is computing equipment 10 such as an IBM PC or PC-compatible computer having an operating system such as a Microsoft Windows operating system. The computing equipment 10 is provided with a display screen 11 such as a color monitor, a speaker 12 and a microphone 13. Computing equipment 10 further includes a mass storage device such as a computer disk drive 14 for storing data files such as bitmap image data files, text data files, sound (e.g., PCM or pulse code modulation) data files, animation data files and digital motion video data files, in compressed or uncompressed format, and for storing application program files such as a multimedia message management program that can send and receive the aforementioned types of data files, or other information processing program files which contain stored program instruction steps by which computing equipment 10 manipulates data files, presents data in those files to an operator via display screen 11 or speaker 12, or transmits data via telephone lines or network interfaces, or the like.

Keyboard 15 is connected to computing equipment 10 to permit input of text data and to permit operator selection and manipulation of objects displayed on display screen 11. Likewise, pointing device 16 such as a mouse or the like is connected to permit selection and manipulation of objects on the display screen. Scanner 18 scans documents or other images and provides bitmap images of those documents to computing equipment 10. Network interface line 12 connects computing equipment 10 to an unshown local area network, and printer 24 is provided for outputting information processed by computing equipment 10.

An unshown communication board, which is described in more detail below, connects computing equipment 10 to an ordinary telephone handset 19 as well as to telephone line 20. In general, there are many communication control board products adapted for use with computing equipment such as an IBM PC and PC-compatible computers. These boards perform integrated modem/facsimile/telephone control functions. When connected to an ordinary voice telephone line and to an ordinary telephone handset, such communication boards allow a computer to send and receive facsimile transmissions via a fax modem, to send and receive data transmissions via a data modem, and to send and receive voice telephone communications either via a digitized voice file stored on the computer or via the analog telephone handset. A line controller is described in U.S. application No. 08/341,165, filed Nov. 16, 1994, commonly assigned herewith, the contents of which are incorporated herein by reference.

In the present invention, in accordance with operator instructions, stored application programs are activated and permit processing and manipulation of data. For example, any of a variety of application programs such as a multimedia message management program, a word processing program, an image editing program, spreadsheet programs, and similar information processing programs, may be provided for operator selection and use. Thus, a word processing program may be activated to permit an operator to create, view, manipulate and print documents, and to send or receive documents via a communication board and one of the multiple telephone lines. Likewise, a multimedia message management program may be activated to permit an operator to create, manipulate and view multimedia documents which contain a variety of objects such as text objects, bitmap objects, computer graphic objects, sound objects and motion video objects, and to send and to receive such multimedia documents via the communication board on one of the multiple telephone lines. The multimedia message management program may also be provided with telephone handset control capabilities with which an operator, through manipulation and use of a computerized address list, may instruct the computer to cause a telephone line to go off-hook, a selected telephone number to be dialed, and indicate to the operator that the called party has answered. Incoming calls may also be handled by the computer, and a telephone usage log may be maintained. As described in more detail below, the computer can automatically answer an incoming call when the operator does not, record a message and detect and store the telephone number of the calling party to enable the operator to send a reply message at a later time.

Figure 2:
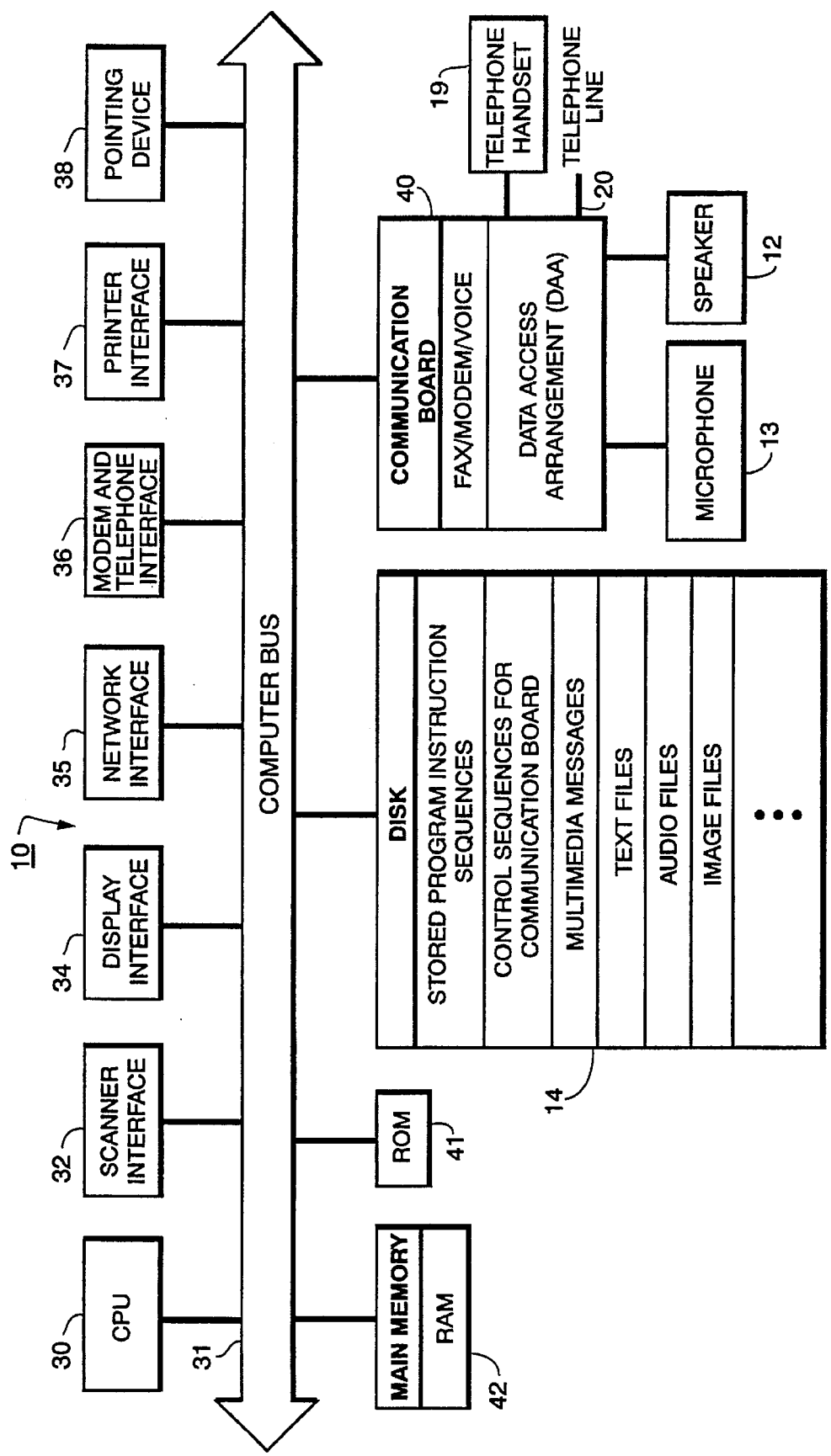
FIG. 2 is a block diagram of the FIG. 1 apparatus.

FIG. 2 is a detailed block diagram showing the internal construction of computing equipment 10. As shown in FIG. 2, computing equipment 10 includes central processing unit (CPU) 30 such as an 80386 or a reduced instruction set computer (RISC) interfaced to computer bus 31. Also interfaced to computer bus 31 is scanner interface 32 for interfacing to scanner 18, display interface 34 for interfacing to display 11, network interface 35 for interfacing to network line 22, modem and telephone interface 36 for interfacing with the telephone line 20, printer interface 37 for interfacing to printer 24, and pointing interface 38 for interfacing to pointing device 16.

Read only memory (ROM) 41 interfaces with computer bus 31 so as to provide CPU 30 with specialized and invariant functions such as start-up programs or BIOS programs. Main memory 42 which includes random access memory (RAM) provides CPU 30 with memory storage both for data and application programs, as required. In particular, when executing stored program instruction sequences such as multimedia message management programs, CPU 30 normally loads those instruction sequences from disk 14 (or other program storage media) to main memory 42 and executes those stored program instruction sequences out of the main memory.

A communication board 40 which includes a data communication device is connected to computer bus 31 so as to provide computing equipment 10 with access to and control over the telephone line and an ordinary telephone handset. The communication board device on 40 preferably includes a combined fax/modem/voice chipset such as the type described in the RC96ACL/RC144ACL Modem Designer's Guide, Rockwell International Digital Communications Division, published 1993, the contents of which are incorporated herein by reference. Such a fax/modem/voice chipset provides a facsimile modem for automatic facsimile transmission and reception, a data modem for automatic data transmission and reception and a digital voice communication capability for digitizing incoming voice communications and storing the digitized voice in a computer file, and/or converting a digitized voice in computer files into analog form for play out over voice telephone lines.

The communication board 40 further includes a data access arrangement (DAA) for connecting telephone line 20 to the fax/modem/voice chipset. The DAA further includes the capability for connecting to external speaker 12 or microphone 13 as well as for connecting to ordinary voice telephone handset 19.

Figure 3:
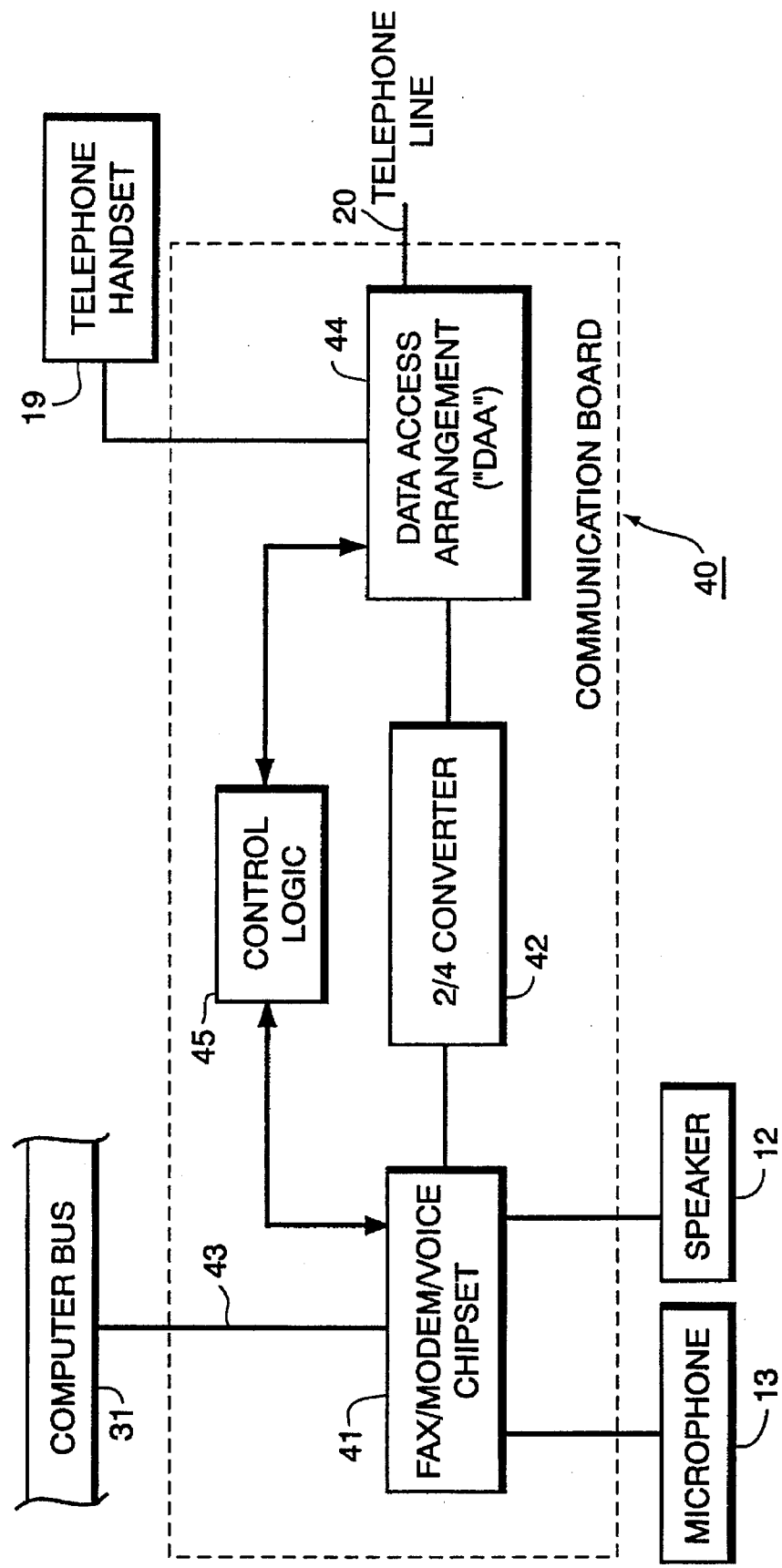
FIG. 3 is a functional block diagram of a communication board according to the invention.

FIG. 3 is a functional block diagram of communication board 40. As shown in FIG. 3, communication board 40 includes a communication device such as the aforementioned fax/modem/voice chipset 41, and a 2/4 converter 42. The 2/4 converter 42 converts a four-wire signal from the fax/modem/voice chipset 41 into a two-wire signal for connection to ordinary voice telephone lines. The two-wire signal from 2/4 converter 42 is fed to data access arrangement (DAA) 44. The data access arrangement, under control via control logic 45 from chipset 41 and computing equipment 10, connects telephone line 20 to the chipset via the 2/4 converter 42. Additionally, DAA 44 includes handset switches for each telephone line for switchably connecting, under control via control logic 45 from chipset 41 and computing equipment 10, the telephone line 20 to telephone handset 19.

Preferably, and as depicted in FIG. 3, the communication board 40 is arranged on a single, multiple-layer, circuit board provided with an edge connector 43 for connection to computer bus 31, as well as suitable RJ-14 connectors for connection to handset 19 and telephone line 20. The single-board construction allows board 40 to be inserted into the housing of conventional PC-type computing equipment. Of course, the communication board 40 may, in fact, be comprised by multiple interconnected circuit boards.

Alternatively, communication board 40 can be modified to support two telephone lines for handling two telephone calls simultaneously, as shown, for example, in U.S. Pat. No. 5,515,423. Three or more telephone lines may be correspondingly supported.

Figure 4:
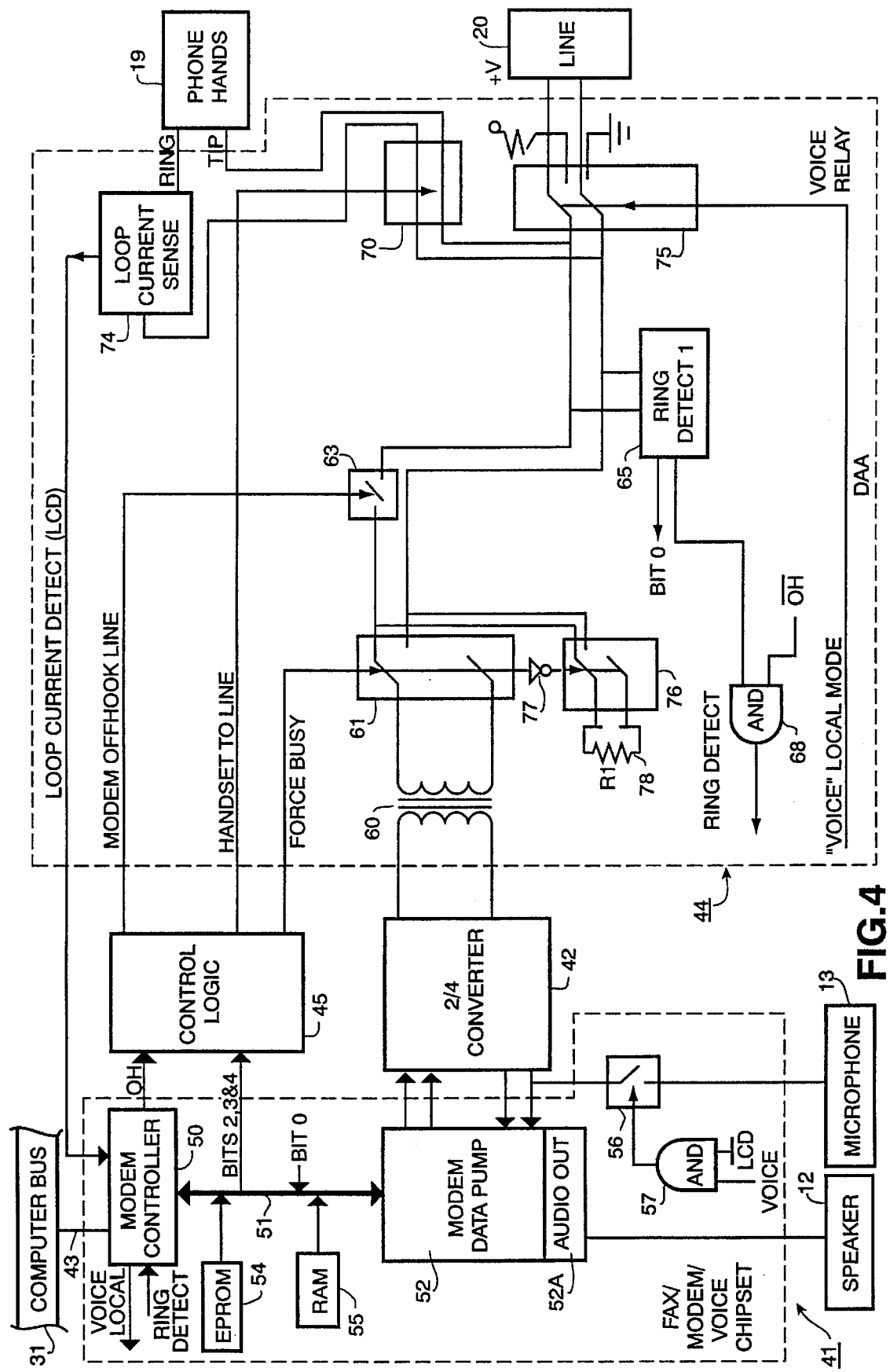
FIG. 4 is a schematic circuit diagram of the communication board shown in FIG. 3.

FIG. 4 is a schematic diagram illustrating the communication board of FIG. 3. As shown in FIG. 4, the fax/modem/voice chipset 41 includes a modem controller 50 connected via modem bus 51 to a modem data pump 52. Also connected to modem bus 51 are EPROM 54 and local RAM 55 which serve as memories for programming and processing operations of the modem and which may have a capacity of 128K bytes each. An audio path in chipset 41 includes an audio output interface portion 52a of the modem data pump which is connectable to speaker 12, as well as an audio-in switch 56 which permits connection to microphone 13 so as to provide the modem data pump 52 with an audio input interface under control of AND device 57.

In operation, modem controller 50, via commands and data sent from computing equipment 10 on computer bus 31, sets its state and the state of the modem data pump to one of audio in, audio out, fax modem, data modem or voice. Then, modem controller 50 causes modem data pump either to output audio signals to speaker 12, to input audio signals from microphone 13, or to transmit or receive fax, modem or voice information via a four-wire connection to 2/4 converter 42.

2/4 converter 42 converts the four-wire connection from modem data pump 52 into a two-wire connection to data access arrangement (DAA) 44.

As further shown in FIG. 4, DAA 44 includes a transformer 60 for impedance-matching the two-wire signal from 2/4 converter 42 to the impedance of an ordinary voice telephone line.

The telephone line 20 is connected in series with the transformer 60 by a modem off-hook switch 63. Under control from control logic 45, this switch may be activated so as to cause the line to go off-hook with respect to fax/modem/voice chipset 41.

Ring detect circuit 65 detects ringing signals on line 20. In response to a ringing signal, the ring detect circuit sets a bit in an unshown computer register indicating that the line 20 is ringing. The resultant ring detect signal is sent to modem controller 50 whereby modem controller 50 can recognize when line 20 is ringing. In this regard, AND gate 68 is provided so that a ring detect signal is blocked when modem controller 50 is engaged in modem operations. Thus, when line 20 is off-hook via off-hook switch 63, an off hook signal OH is generated by modem controller 50. The OH signal blocks a ring detect signal in the event that line 20 is off-hook, thereby preventing modem controller 50 from being interrupted from its modem operations when the line is off-hook and engaged in modem operations.

The DAA further includes for telephone line 20 handset switch 70 for connecting line 20 to telephone handset 19. The handset switch 70 is operated under control of control logic 45 via a "handset to line 1" control signal. This signal is set such that if data communications are being conducted on the telephone line, the handset is not connected to that line.

A loop current detect device 74 is positioned between the ring and tip wires of telephone handset 19 so as to sense a loop current when the handset in telephone handset 19 is lifted. If a loop current is detected, then a loop current detect (LCD) signal is sent to modem controller 50 and to AND gate 57.

Telephone handset 19 is operable in either a manual mode or a computer-controller mode. In the manual mode, when telephone handset 19 is lifted, it is connected to telephone line 20 in accordance with the setting of handset switch 70. Manual outgoing dialing and voice communication may then occur.

For computer-controlled outgoing dialing, computing equipment 10 first causes the off-hook switch 63 to close and then the modem controller 50 causes modem data pump 52 to initiate telephone dialing such as DTMF or pulse dialing over the selected line. Handset switch 70 is set and the user is then instructed to lift the handset from telephone handset 19. As soon as a loop current detect (LCD) signal is detected, indicating the presence of loop current between the tip and ring wires of telephone handset 19, modem controller 50 disconnects off-hook switch 63 to permit the user to conduct ordinary voice communication. If the user does not lift the handset from telephone handset 19, then the LCD signal will not be detected, and when the called party answers, the fax/modem/voice chipset 41 will operate in accordance with its ordinary programming.

For incoming calls, ring detect circuit 65 detects that the telephone line 20 carries a ringing signal, and signals that detection to modem controller 50 via AND gate 68. Computing equipment 10 reads its unshown computer register to determine that line 20 is ringing, and control logic 45 sets handset select switch 70 to the ringing line. If, after a predetermined period such as two rings, the LCD signal is not detected indicating that the user has not lifted the handset, then control logic 45 causes the ringing line to go off-hook by setting modem off-hook switch 63. The fax/modem/voice chipset then operates in accordance with its pre-programmed instructions. Ordinarily, computing equipment 10 is programmed such that if the LCD signal is detected by the user lifting the handset from telephone handset 19, off-hook switch 63 is disconnected leaving the user in ordinary voice communication with the calling party.

As mentioned above, if the fax/modem/voice chipset 41 is engaged in data communications via telephone line 20, then the ring detect signal to chipset 41 is blocked via AND gate 68 because of the existence of the OH signal. Because the ring detect signal is blocked, chipset 41 will not be interrupted in its fax or modem or voice communications. At the same time, because handset switch 70 is ordinarily set to the telephone line, any incoming calls on that line will activate the ringer in telephone handset 19 thus alerting the user aurally to the presence of such a ringing signal.

DAA 44 further includes a voice relay 75 for setting DAA 44 to a voice local mode. In the voice local mode, voice relay 75 is activated to disconnect DAA 44 from all telephone lines and to connect the DAA to a $V^+$. Thereafter, sound from modem data pump 52 may be heard over speaker 12 or the speaker in telephone handset 19. At the same time, sound may be recorded from either microphone 13 or from the microphone in telephone handset 19. In this regard, using loop current detect signal LCD, AND gate 57 will block recording of sound from microphone 13 in the case that the handset has been lifted from the telephone handset 19 thereby preventing sound from being recorded from both the telephone handset and microphone 13 at the same time.

Relay 76 operates to force a busy signal on the multiple telephone line. Thus, as shown in FIG. 4, relay 76 is connected to the telephone line 20 between the switch 61 and off-hook switch 63. The relay is actuated through inverter 77 by a signal from control logic 45 and operates to connect the telephone line to resistor R1 which has a value, e.g., 100 Ω, low enough to indicate to the telephone central office that the telephone line is busy.

In operation, and in response to an incoming call on the telephone line, the system preferentially activates the data communication device, here the modem/fax/voice chipset, while activating the handset when the communication device is busy. In addition, the communication device is protected from unwanted interruptions while allowing a user manually to respond to incoming calls via the telephone handset 19. It is also possible to block incoming calls by forcing telephone line 20 to a busy state. Such functionality is possible in an unattended state where a user is unable to respond manually to incoming telephone calls while the communication device is in use, for example, to accommodate automatic message dialing systems, such as remote facsimile machines, ordinarily have re-try modes for message dialing, and those re-try modes are activated only if a busy signal is obtained.

However, the present invention provides an advantageous alternative to such a system in handling incoming telephone calls when the user is unable to respond personally at the time the call comes in. Instead of leaving the call unanswered or forcing a busy signal, the computing equipment can be programmed to cause the incoming call to be answered, to detect the telephone number of the remote terminal without intervention by the user of the computing equipment and to record any incoming voice message from the remote terminal. Thereafter, the user can retrieve the stored incoming message and prepare a reply message. A telephone call can then be placed to the remote terminal in accordance with the recorded telephone number.

This system provides the user with a highly advantageous arrangement for responding to incoming telephone calls. Because the telephone number of the remote terminal is detected automatically without intervention by the user, it will be available every time an incoming call is received, regardless of whether the caller at the remote terminal then chooses to leave a voice message. The user will therefore have a record of who called, regardless of the recorded messages. Furthermore, the user has the telephone number already in storage and therefore need not look it up or enter it himself when he wishes to return the telephone call.

The CPU 30 of the computing equipment acts as a processor for receiving the incoming call and recording the telephone number of the remote terminals in main memory 42. CPU 30 also controls the computing equipment 10 to act as a reply apparatus for sending a reply telephone call to the remote terminal in accordance with the stored telephone number.

The telephone number can be detected by CPU 30 in any of a variety of ways. For example, many switching systems can supply the well-known Automatic Number Identification (ANI) of the calling customer within the control information for the telephone call, and the apparatus may include detecting means for detecting the telephone number by ANI processing. The telephone number might also be provided by Caller ID processing, by detecting the telephone number in facsimile handshake information or by using optical character recognition processing on image data of a facsimile cover sheet. In further examples, the apparatus can prompt the remote terminal to provide the telephone number as DTMF signals, or might prompt the calling party to vocalize the telephone number and then use voice recognition processing to detect the telephone number in the following voice message.

Of course, the above-noted methods of detecting the telephone number in the incoming call are all conventional and therefore will not be described in detail herein. However, the use of these conventional techniques by the computing equipment 10 provides novel and unobvious methods of responding to these incoming telephone calls that have not previously been available to an individual user.

In accordance with this aspect of the present invention, when ring detector 65 detects an incoming call and computing equipment 10 determines that an incoming call is being received on line 20, and then after two rings, the LCD signal is not detected indicating that the user does not lift the handset, CPU 30 is programmed to automatically answer the incoming telephone call by causing the line 20 to go off-hook. The fax/modem/voice chipset 41 then operates in accordance with preprogrammed instructions to forward to CPU 30 the information from the telephone line including the telephone number of the remote terminal. This step may include transmitting data already available on the telephone line, such as ANI or Caller ID information, facsimile handshake information or image data of a facsimile cover sheet. When such data does not appear on the line, CPU 30 can prompt the caller at the remote terminal to provide the telephone number in any of a variety of ways. For example, the caller can be prompted to provide the telephone number as DTMF signals, which can be analyzed and converted to the corresponding telephone digits. Alternatively, CPU 30 can prompt the calling party to vocalize the telephone number and use voice recognition processing to detect the telephone number in the following voice message.

The processes by which the computing equipment 10 performs these functions are illustrated in FIGS. 5–8.

Figure 5:
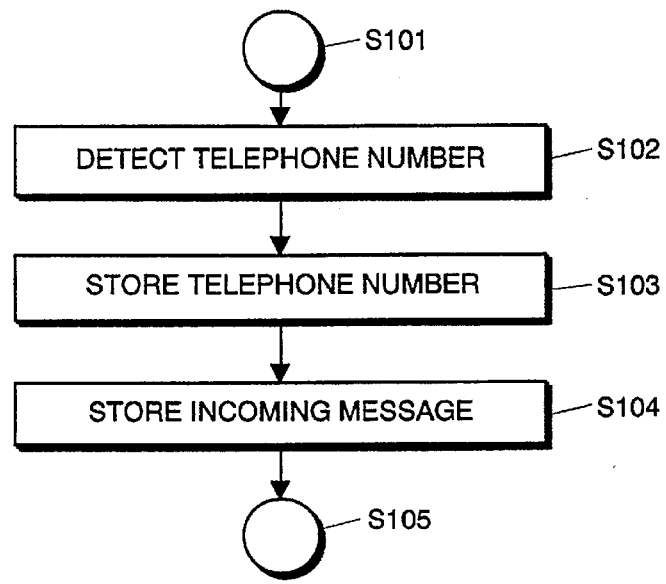
FIG. 5 is a flowchart of a program for receiving an incoming telephone call.

As illustrated in FIG. 5, when an incoming telephone call is received, CPU 30 loads and executes a program 100 that begins in step S101. In step S102, the telephone number of the remote terminal is detected by any of the methods indicated above. In step S103 the detected telephone number is stored, for example in memory 42, and in step S104, an incoming voice message, if any, can be stored on disk 14 or on an optional tape recorder. The program ends at step S105. By detecting the telephone number and storing it without first requiring that a voice message be recorded, the user of the computing equipment 10 can retrieve a list of those who called regardless of whether the callers left messages.

Figure 6:
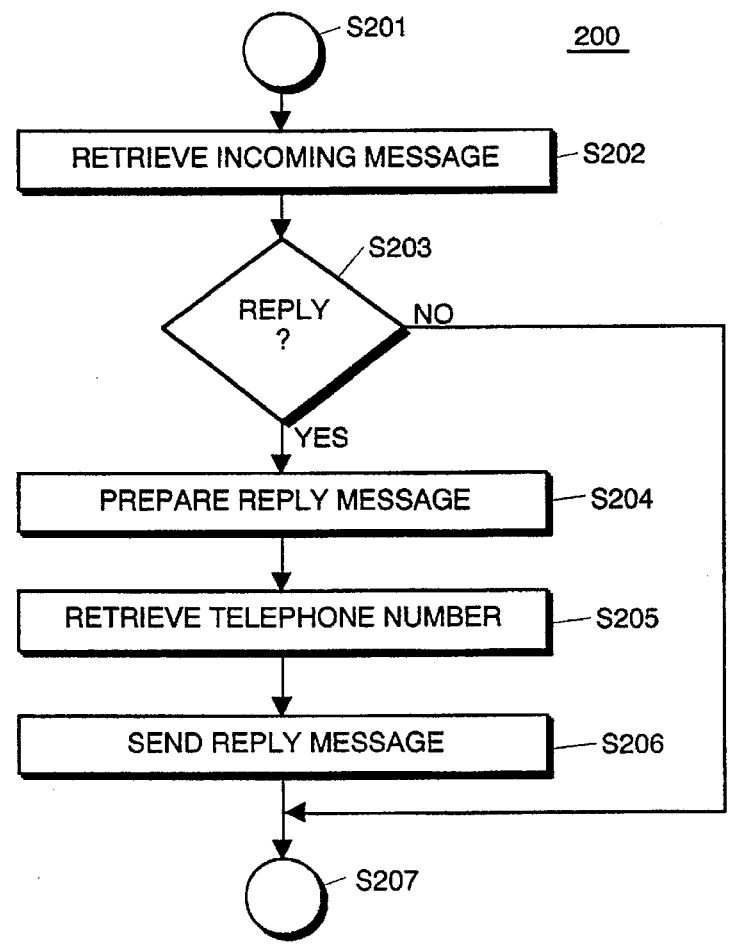
FIG. 6 is a flowchart of a program for placing a reply telephone call.

FIG. 6 illustrates a program 200 by which the user can prepare and send a reply message. Program 200 begins in step S201 and in step S202 the incoming message is retrieved and presented to the user, either visually on the display 11 or aurally by, the speaker 12. In step S203, the user can indicate that he does not wish to send a reply message, for example, by exiting the program, and program 200 then ends in step S207. However, if the user wishes to send a reply, then in step S204 a reply message can be prepared and in step S205 the telephone number can be retrieved. In step S206 the reply message can be sent to the remote terminal by placing a telephone call in accordance with the retrieved telephone number and the program then ends in step S207.

Figure 7:
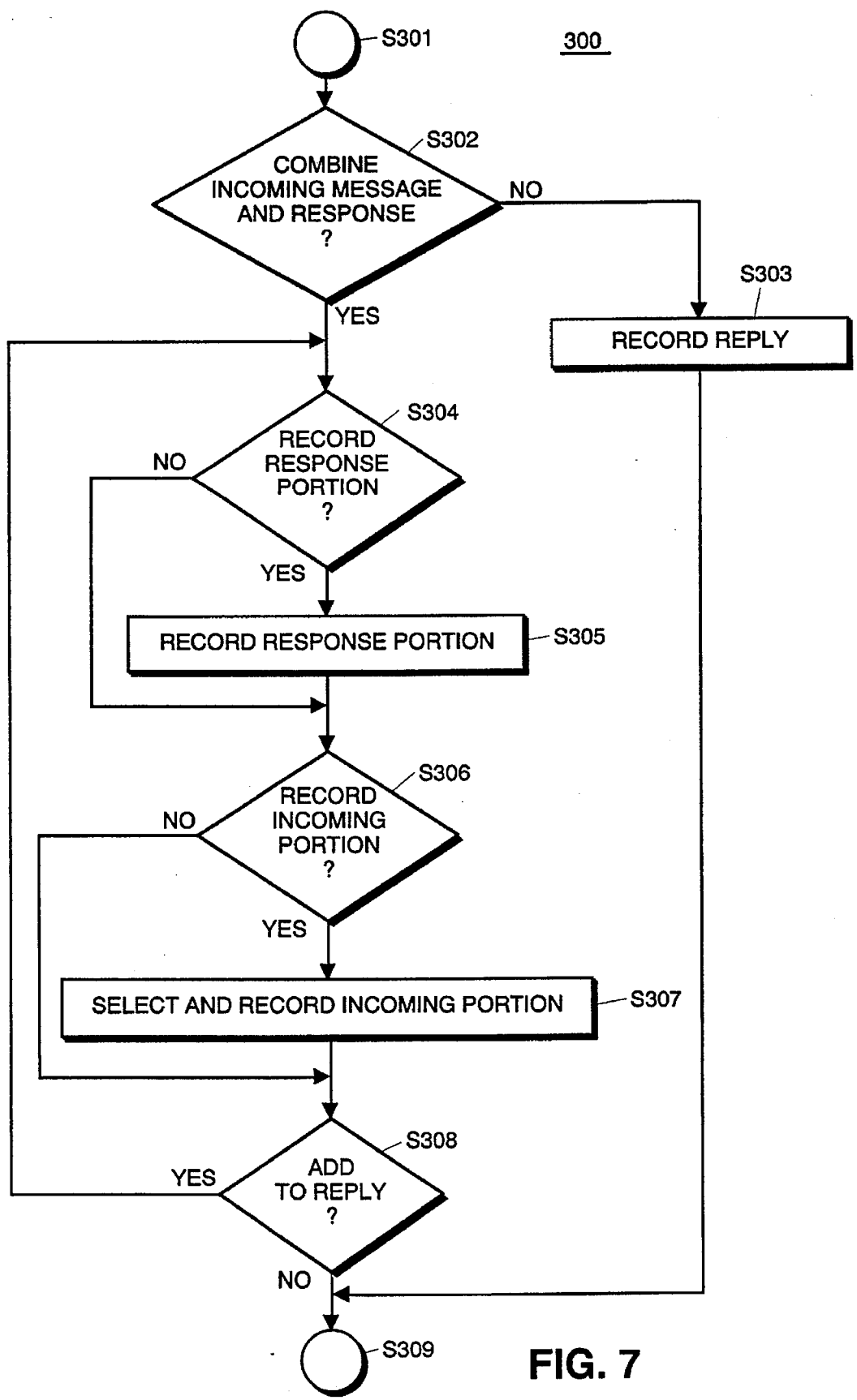
FIG. 7 is a flowchart of a program for preparing a reply message.

The operations in step S204 in preparing the reply message are shown in more detail in FIG. 7, illustrating a program 300. When the user begins the preparation of the reply message, the program 300 begins at step S301 and then in step S302 the user is queried whether he wishes to prepare a reply message combining portions of the incoming message and response portions provided by the user himself. If the user does not wish to combine portions of the incoming message with his reply, the program proceeds to step S303, wherein the user can record a reply message, for example by entering a voice message through microphone 13 or by entering text data through the keyboard. The program then ends in step S309.

However, if the user wishes to combine the incoming message with his response, for example, in order to reply to a number of questions presented in the incoming message one at a time, the program proceeds to step S304, which queries whether the user wishes to first record a response portion. If the answer is yes, then the program proceeds to step S305 in which the user records the response portion. Thereafter, or if the answer in step S204 was no, the program proceeds to step S306 and queries the user whether he wishes to record an incoming portion, that is, a portion of the incoming message. If the answer is yes, then the program proceeds to step S307, in which the user can select which portion of the incoming message is to be recorded at this time and record that incoming portion. After the incoming portion is selected and recorded, or if in step S306 the user indicates that he does not wish to record an incoming portion, then the program proceeds to step S308. In step S308, the user is queried whether he wishes to add anything to the reply, either a response portion or an incoming portion. If the answer is yes, the program returns to step S304 to determine what new portions should be added to the reply. If in step S308 the user is satisfied with the reply, then the program ends in step S309.

Figure 8:
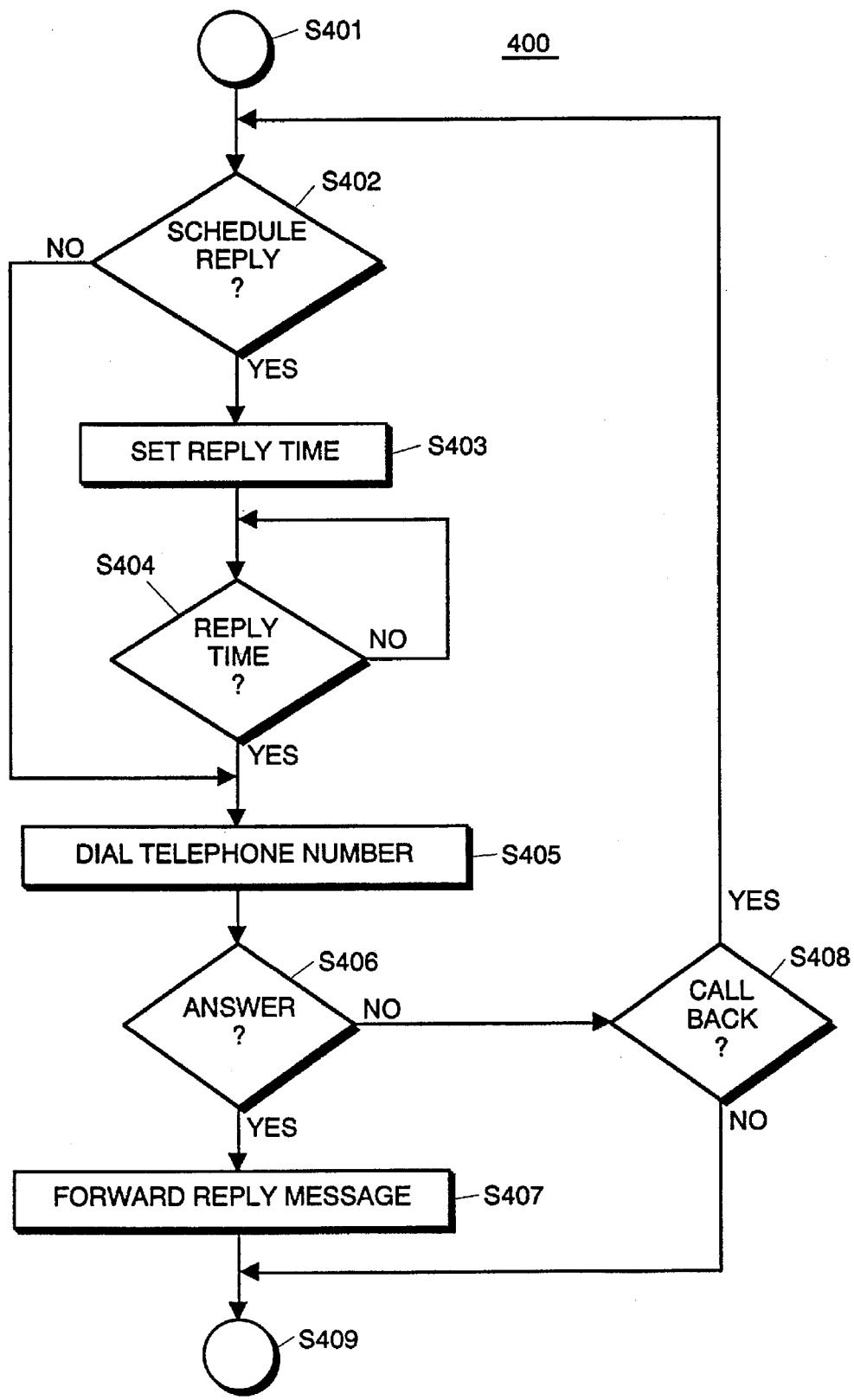
FIG. 8 is a flowchart of a program for scheduling the reply telephone call.

The operation of the computing equipment in sending the reply message in step S206 in FIG. 6 is illustrated in more detail in FIG. 8, illustrating a program 400. The program begins in step S401 and in step S402, the user is queried whether he wishes the reply message to be sent immediately or to be scheduled for transmission at a later time. If the answer in step S402 is no, that is, if the reply is to be sent immediately, then the program proceeds to step S405 in which the telephone number of the remote terminal is dialed in accordance with the stored information. If the remote terminal answers in step S406, the reply message is forwarded to the remote terminal in step S407 and the program ends in step S409. If the remote terminal does not answer in step S406, then the computing equipment queries whether a call back should be made at a later time in step S408. This query can be made to the user, or can be determined in accordance with preset instructions. If no call back is required, then the program ends in step S409. However, if a call back is required, then the program returns to step S402, to again determine whether a reply time for sending a reply message should be scheduled. If the answer is yes, then step S403 the reply time is set, either by the user or in accordance with a preset time. The program waits until the reply time in step S404, and then proceeds to step S405 to place the reply telephone call as described above.

The above description has been made for computing equipment having a single telephone line connected thereto. However, computer users today ordinarily have more than one telephone line available to them. They use these multiple telephone lines to permit the computer to transmit fax/modem/voice messages over one telephone line at the same time as an ordinary voice conversation is conducted on a telephone handset over a second telephone line. A two-line telephone controller is described in U.S. Pat. No. 5,515,423, commonly assigned herewith, the contents of which are incorporated herein by reference. The present invention can be applied to a two-line or multiple-line system by providing that each line is answerable separately.

The above description has been given for a few exemplary embodiments, but it will be apparent to those of ordinary skill in the art that many changes and variations are possible without departing from the scope of the invention, which is to be determined by the appended claims.

What is claimed is:

1. A telephone communication apparatus comprising:

computing equipment programmed to permit a user to send and receive telephone calls over a telephone line;

a call detector connected to said computing equipment for detecting, on the telephone line, an incoming telephone call which includes at least an incoming voice message from a remote terminal having a telephone number associated with the remote terminal;

a communication board connected to said computing equipment and responsive to program control from said computing equipment, said computing equipment being responsive to detection of the incoming telephone call by said call detector to connect the telephone line to said computing equipment;

recording means for recording a reply message which includes at least a reply voice message from the user, wherein the user controls said recording means to record the reply message by selectively retrieving from a storage means portions of the incoming voice message such that the retrieved portions of the incoming voice message are interleaved in the recorded reply message with the recorded reply voice message from the user, said computing equipment including a data storage means, a processor for receiving the incoming telephone call and recording the telephone number of the remote terminal in said data storage means without intervention by the user at said apparatus, and a reply apparatus for sending a reply telephone call including the recorded reply message to the remote terminal in accordance with the recorded telephone number; and designating means, operative by the user after termination of the incoming telephone call, for designating a reply time, wherein said reply apparatus is adapted to send the reply telephone call at the reply time.

2. An apparatus according to claim 1, wherein the incoming telephone call includes control information, and said processor includes detection means for detecting the telephone number of the remote terminal in the incoming voice message.

3. An apparatus according to claim 2, wherein said apparatus includes means for sending a prompt to the remote terminal to request that the telephone number of the remote terminal be provided as part of the incoming voice message and recognition means for recognizing the telephone number of the remote terminal in the voice message using speech recognition processing.

4. An apparatus according to claim 1, wherein the incoming telephone call includes control information, and said apparatus includes means for detecting the telephone number of the remote terminal as part of the control information.

5. An apparatus according to claim 4, wherein said apparatus includes means for sending a prompt to the remote terminal to request that the telephone number of the remote terminal be provided as DTMF signals.

6. An apparatus according to claim 4, wherein said apparatus includes means for detecting the telephone number of the remote terminal using Caller ID processing.

7. An apparatus according to claim 4, wherein said incoming telephone call includes a facsimile message and facsimile handshake information containing the telephone number of the remote terminal, wherein said apparatus includes means for detecting the telephone number of the remote terminal in the facsimile handshake information.

8. An apparatus according to claim 4, wherein said incoming telephone call includes a facsimile message including image data of a cover sheet containing the telephone number of the remote terminal, wherein said apparatus includes means for recovering the telephone number of the remote terminal from the image data using optical character recognition processing.

9. An apparatus according to claim 4, wherein said processor includes detecting means for detecting the telephone number of the remote terminal by Automatic Number Identification processing.

10. A telephone communication apparatus comprising:

computing equipment programmed to permit a user to send and receive telephone calls over a telephone line;

a call detector connected to said computing equipment for detecting, on the telephone line, an incoming telephone call which includes at least an incoming voice message from a remote terminal having a telephone number associated with the remote terminal;

a communication board connected to said computing equipment and responsive to program control from said computing equipment, said computing equipment being responsive to detection of the incoming telephone call by said call detector to connect the telephone line to said computing equipment; and recording means for recording a reply message which includes at least a reply voice message from the user, wherein the user controls said recording means to record the reply message by selectively retrieving from a storage means portions of the incoming voice message such that the retrieved portions of the incoming voice message are interleaved in the recorded reply message with the recorded reply voice message from the user, said computing equipment including a data storage means, a processor for receiving the incoming telephone call and recording the telephone number of the remote terminal in said data storage means without intervention by the user at said apparatus, and a reply apparatus for sending a reply telephone call including the recorded reply message to the remote terminal in accordance with the recorded telephone number.

11. An apparatus according to claim 10, wherein the incoming telephone call includes control information, and said processor includes detection means for detecting the telephone number of the remote terminal in the incoming voice message.

12. An apparatus according to claim 11, wherein said apparatus includes means for sending a prompt to the remote terminal to request that the telephone number of the remote terminal be provided as part of the incoming voice message and recognition means for recognizing the telephone number of the remote terminal in the incoming voice message using a speech recognition process.

13. An apparatus according to claim 10, wherein the incoming telephone call includes control information, and said apparatus includes means for detecting the telephone number of the remote terminal as part of the control information.

14. An apparatus according to claim 13, wherein said apparatus includes means for sending a prompt to the remote terminal to request that the telephone number of the remote terminal be provided as DTMF signals.

15. An apparatus according to claim 13, wherein said apparatus includes means for detecting the telephone number of the remote terminal using Caller ID processing.

16. An apparatus according to claim 13, wherein said incoming telephone call includes a facsimile message and facsimile handshake information containing the telephone number of the remote terminal, wherein said apparatus includes means for detecting the telephone number of the remote terminal in the facsimile handshake information.

17. An apparatus according to claim 13, wherein said incoming telephone call includes a facsimile message including image data of a cover sheet containing the telephone number of the remote terminal, wherein said apparatus includes means for recovering the telephone number of the remote terminal from the image data using optical character recognition processing.

18. An apparatus according to claim 13, wherein said processor includes detecting means for detecting the telephone number of the remote terminal by Automatic Number Identification processing.

19. A telephone communication apparatus comprising:

computing equipment programmed to permit a user to send and receive telephone calls over a telephone line;

a call detector connected to said computing equipment for detecting, on the telephone line, an incoming telephone call which includes at least an incoming voice message from a remote terminal having a telephone number associated with the remote terminal;

a communication board connected to said computing equipment and responsive ho program control from said computing equipment, said computing equipment being responsive to detection of the incoming telephone call by said call detector to connect the telephone line to said computing equipment;

recording means for recording a reply message which includes at least a reply voice message from the user, wherein the user controls said recording means to record the reply message by selectively retrieving from a storage means portions of the incoming voice message such that the retrieved portions of the incoming voice message are interleaved in the recorded reply message with the recorded reply voice message from the user, said computing equipment including a data storage means, a processor for receiving the incoming telephone call and recording the telephone number of the remote terminal in said data storage means without intervention by the user at said apparatus, and a reply apparatus for sending a reply telephone call including the recorded reply message to the remote terminal in accordance with the recorded telephone number; and designating means, operative by the user after termination of the incoming telephone call, for designating a reply time, wherein said reply apparatus sends the reply telephone call at the reply time.

20. A telephone communication apparatus comprising:

telephone equipment permitting a user to send and receive telephone calls over a telephone line;

a call detector connected to said telephone equipment for detecting, on the telephone line, an incoming telephone call which includes at least an incoming voice message from a remote terminal, said telephone equipment being responsive to detection of the incoming telephone call by said call detector to connect the telephone line to said telephone equipment;

recording means for recording a reply message which includes at least a reply voice message from the user, wherein the user controls said recording means to record the reply message by selectively retrieving from a storage means portions of the incoming voice message such that the retrieved portions of the incoming voice message are interleaved in the recorded reply message with the recorded reply voice message from the user, said telephone equipment including a reply apparatus for sending a reply telephone call including the recorded reply message to the remote terminal; and designating means, operative by the user after termination of the incoming telephone call, for designating a reply time, wherein said reply apparatus is adapted to send the reply telephone call at the reply time.

21. An apparatus according to claim 20, wherein said telephone equipment includes recording means for recording a telephone number of the remote terminal in data storage means without intervention by the user at said apparatus.

22. An apparatus according to claim 21, wherein the incoming telephone call includes control information, and said recording means includes detection means for detecting the telephone number of the remote terminal in the incoming voice message.

23. An apparatus according to claim 22, wherein said apparatus includes means for sending a prompt to the remote terminal to request that the telephone number of the remote terminal be provided as part of the voice message and recognition means for recognizing the telephone number of the remote terminal in the voice message using speech recognition processing.

24. An apparatus according to claim 20, wherein the incoming telephone call includes control information, and said apparatus includes means for detecting a telephone number of the remote terminal as part of the control information.

25. An apparatus according to claim 24, wherein said apparatus includes means for sending a prompt to the remote terminal to request that the telephone number of the remote terminal be provided as DTMF signals.

26. An apparatus according to claim 24, wherein said apparatus includes means for detecting the telephone number of the remote terminal using Caller ID processing.

27. An apparatus according to claim 24, wherein said incoming telephone call includes a facsimile message and facsimile handshake information containing the telephone number of the remote terminal, wherein said apparatus includes means for detecting the telephone number of the remote terminal in the facsimile handshake information.

28. An apparatus according to claim 24, wherein the incoming telephone call includes a facsimile message including image data of a cover sheet containing the telephone number of the remote terminal, wherein said apparatus includes means for recovering the telephone number of the remote terminal from the image data using optical character recognition processing.

29. An apparatus according to claim 21, wherein said recording means includes detecting means for detecting the telephone number of the remote terminal by Automatic Number identification processing.

30. A telephone communication apparatus comprising:
telephone equipment permitting a user to send and receive telephone calls over a telephone line;
a call detector connected to said telephone equipment for detecting, on the telephone line, an incoming telephone call which includes at least an incoming voice message from a remote terminal, said telephone equipment being responsive to detection of the incoming telephone call by said call detector to connect the telephone call to said telephone equipment; and recording means for recording a reply message which includes at least a reply voice message from the user, wherein the user controls said recording means to record the reply message by selectively retrieving from a storage means portions of the incoming voice message such that the retrieved portions of the incoming voice message are interleaved in the recorded reply message with the recorded reply voice message from the user, said telephone equipment including a reply apparatus for sending a reply telephone call including the recorded reply message to the remote terminal.

31. An apparatus according to claim 30, wherein said telephone equipment includes recording means for recording a telephone number of the remote terminal in data storage means without intervention by the user at said apparatus.

32. An apparatus according to claim 31, wherein the incoming telephone call includes control information, and said recording means includes detection means for detecting the telephone number of the remote terminal in the incoming voice message.

33. An apparatus according to claim 32, wherein said apparatus includes means for sending a prompt to the remote terminal to request that the telephone number of the remote terminal be provided as part of the incoming voice message and recognition means for recognizing the telephone number of the remote terminal in the incoming voice message using a speech recognition process.

34. An apparatus according to claim 30, wherein the incoming telephone call includes control information, and said apparatus includes means for detecting a telephone number of the remote terminal as part of the control information.

35. An apparatus according to claim 34, wherein said apparatus includes means for sending a prompt to the remote terminal to request that the telephone number of the remote terminal be provided as DTMF signals.

36. An apparatus according to claim 34, wherein said apparatus includes means for detecting the telephone number of the remote terminal using Caller ID processing.

37. An apparatus according to claim 34, wherein said incoming telephone call includes a facsimile message and facsimile handshake information containing the telephone number of the remote terminal, wherein said apparatus includes means for detecting the telephone number of the remote terminal in the facsimile handshake information.

38. An apparatus according to claim 34, wherein the incoming telephone call includes a facsimile message including image data of a cover sheet containing the telephone number of the remote terminal, wherein said apparatus includes means for recovering the telephone number of the remote terminal from the image data using optical character recognition processing.

39. An apparatus according to claim 31, wherein said recording means includes means for detecting the telephone number of the remote terminal by Automatic Number Identification processing.

* * * * *